United States Patent [19]

Kaneishi et al.

[11] Patent Number: 5,545,027
[45] Date of Patent: Aug. 13, 1996

[54] GAS-FEEDING DEVICE FOR INJECTION MOLDING

[75] Inventors: Akimasa Kaneishi; Kenzi Kono, both of Hiratsuka, Japan

[73] Assignee: Mitsubishi Gas Chemical Company, Inc., Tokyo, Japan

[21] Appl. No.: 243,801

[22] Filed: May 17, 1994

[30] Foreign Application Priority Data

Jun. 2, 1993 [JP] Japan .................................. 5-132095

[51] Int. Cl.⁶ .......................... B29C 45/03; B29C 45/34
[52] U.S. Cl. .................... 425/546; 264/328.12; 264/572; 425/130; 425/533; 425/812
[58] Field of Search ............................ 425/533, 546, 425/130, 812; 264/572, 328.12

[56] References Cited

U.S. PATENT DOCUMENTS

| | | |
|---|---|---|
| 4,740,150 | 4/1988 | Sayer . |
| 5,044,924 | 9/1991 | Loren . |
| 5,198,238 | 3/1993 | Baxi .................................. 264/572 |
| 5,256,047 | 10/1993 | Moldovanyi .......................... 264/572 |
| 5,409,659 | 4/1995 | Matsumoto et al. .................... 264/572 |

FOREIGN PATENT DOCUMENTS 0577840  1/1994  European Pat. Off. .

OTHER PUBLICATIONS

Patent Abstracts of Japan, vol. 17, No. 635 (M-1514), Nov. 1993.

*Primary Examiner*—Jay H. Woo
*Assistant Examiner*—Joseph L. Leyson
*Attorney, Agent, or Firm*—Wenderoth, Lind & Ponack

[57] ABSTRACT

A gas-feeding device as follows:
(A) a gas-feeding nozzle and
(B) gas-feeding nozzle shifting device for putting a top portion of the gas-feeding nozzle in forward and backward movement in a guide portion which is provided in a mold and communicates with a cavity and an outside of the mold, the gas-feeding device being used for feeding a pressurized gas through the gas-feeding nozzle into a molten resin injected into the cavity of the mold attached to an injection molding machine for producing a molded article having a hollow portion, wherein:
a clearance is provided between the top portion of the gas-feeding nozzle and the guide portion, and
at least part of the top portion of the gas-feeding nozzle is out of contact with the guide portion when the molten resin is injected into the cavity.

5 Claims, 8 Drawing Sheets

GAS-FEEDING DEVICE FOR INJECTION MOLDING

BACKGROUND OF THE INVENTION AND RELATED ART

The present invention relates to a gas-feeding device for use in the production of a molded article having an excellent appearance free from sink marks and distortion, by an injection molding method. More specifically, it relates to a gas-feeding device for feeding a pressurized gas into a molten resin injected into a cavity of a mold, attached to an injection molding machine for producing a molded article having a hollow portion.

For example, JP-A-64-14012 (corresponding to U.S. Pat. No. 4,740,150) discloses an injection molding machine used for injection molding a molten thermoplastic resin for producing a molded article having an excellent appearance free from sink marks and distortion. In the injection molding method disclosed in JP-A-64-14012, as shown in FIG. 1 attached thereto, a molten plastic material 19 is injected into a mold cavity 13, then a pressurized gas is fed into the molten plastic material 19 in the mold cavity 13 to form a gas-containing hollow portion 25 within the plastic material 19, and the gas within the gas-containing hollow portion 25 is released into atmosphere before the mold is opened.

In the gas-feeding device disclosed in the above JP-A-64-14012, for feeding the pressurized gas into the molten plastic material 19 in the mold cavity 13, a nozzle 26 is shifted to a forward position as shown in FIG. 2 attached to JP-A-64-14012. In this state, a cap 32 of the nozzle 26 is in contact, under pressure, with a conical valve seat of a valve opening 42 provided to an insert 41 in a lower mold member 12. The contact of the cap 32 of the nozzle 26 and the valve seat of the valve opening 42 under pressure can prevent the molten plastic material 19 injected into the mold cavity 13 from leaking around the nozzle 26. Further, the pressurized gas can be reliably fed into the molten plastic material 19. When the pressurized gas in the gas-containing hollow portion 25 is released to atmosphere, the nozzle 26 is shifted to a backward position as shown in FIG. 3 attached to JP-A-64-14012. In this state, the cap 32 of the nozzle 26 is apart from the valve opening 42, and the gas in the gas-containing hollow portion 25 is released through the valve opening 42 around the valve 26 and further through a gap formed by the nozzle 26 and the insert 41 to atmosphere. The nozzle 26 is shifted under the control of a piston 29 and a cylinder 27.

In an injection molding machine having the above nozzle 26 and valve opening 42, however, the centerline of the nozzle 26 and the centerline of the valve opening 42 may be sometimes out of line, or a so-called centerline deviation may occur. This centerline deviation sometimes occurs at a mold manufacturing time or an assembly time, or the movements of the piston 29 and the cylinder 27 which put the nozzle 26 in forward and backward movement cause the centerline deviation in some cases.

When the above centerline deviation occurs, a gap is formed between the nozzle 26 and the valve seat of the valve opening 42, and the pressurized gas is insufficiently sealed when it is fed into the molten plastic material 19 injected into the mold cavity 13. As a result, part of the pressurized gas leaks through this gap. Therefore, the pressurized gas can be no longer sufficiently fed into the plastic material 19, and the gas-containing hollow portion 25 is hardly formed within an injection molded article. Otherwise, the gas-containing hollow portion 25 which may be formed no longer has a desired size (volume). As a consequence, the molded article has a sink mark and distortion, and has a poor appearance. Further, when a large centerline deviation occurs, there is another problem in that the plastic material 19 injected into the mold cavity 13 leaks through the gap formed between the nozzle 26 and the valve seat of the valve opening 42 to adhere to an outer wall of the nozzle 26 or to leak out of the mold. When the plastic material 19 adheres to the outer wall of the nozzle 26, the nozzle 26 may be no longer shifted.

The failure in the contact between the nozzle 26 and the valve seat of the valve opening 42 under pressure is caused not only by the centerline deviation between the nozzle 26 and the conical valve seat of the valve opening 42, but also by any one of the defective finish of surface processing of the valve seat of the valve opening 42 and the adhesion of a resin scrap, mold abrasion dust or other foreign substance to the valve seat surface of the valve opening 42. In any one of the above cases, when the nozzle 26 is shifted to a forward position, a gap is formed between the nozzle 26 and the valve seat of the valve opening 42. Further, when a molten thermoplastic resin is injected into the mold cavity 13 without shifting the nozzle 26 to a forward position because of an operation failure or for some other reason, the nozzle 26 and the valve seat of the valve opening 42 are not in a contact state under pressure, and the above problem also takes place.

OBJECT AND SUMMARY OF THE INVENTION

It is therefore an object of the present invention to provide a gas-feeding device which enables the reliable and smooth feeding of a pressurized gas into a molten resin injected into a mold cavity. It is another object of the present invention to provide a gas-feeding device with which a molten resin injected into a mold cavity does not leak from the cavity.

According to the present invention, the above objects and advantages of the present invention are achieved by a gas-feeding device comprising (A) a gas-feeding nozzle and (B) gas-feeding nozzle shifting means for putting a top portion of the gas-feeding nozzle in forward and backward movement in a guide portion which is provided in a mold and communicates with a cavity and an outside of the mold, the gas-feeding device being used for feeding a pressurized gas through the gas-feeding nozzle into a molten resin injected into the cavity of the mold attached to an injection molding machine for producing a molded article having a hollow portion, characterized by that a clearance is provided between the top portion of the gas-feeding nozzle and the guide portion, and at least part of the top portion of the gas-feeding nozzle is out of contact with the guide portion when the molten resin is injected into the cavity.

In the first embodiment of the present invention, preferably, the top portion of the gas-feeding nozzle is put in forward and backward movement in the guide portion in parallel with the axial line of the gas-feeding nozzle. In this embodiment, preferably, cross sections of the top portion of the gas-feeding nozzle and the guide portion, taken at right angles with the axial line of the gas-feeding nozzle, have constant cross-sectional areas. Namely, when it is supposed that the top portion of the gas-feeding nozzle and the guide portion are cut such that the cross sections contain a plane including the axial line of the gas-feeding nozzle, preferably, the cross sections of top portion of the gas-feeding nozzle and the guide portion have the form of rectangle. The cross section of the top portion of the gas-feeding nozzle and the cross section of the guide portion, taken at right angles with the axial line of the gas-feeding nozzle, preferably have similar figures. The top portion of the gas-feeding nozzle and the guide portion, or the guide portion alone, may be tapered such that the cross section(s) thereof keeps/keep getting smaller toward the cavity.

In the first embodiment of the gas-feeding device of the present invention, preferably, the top portion of the gas-feeding nozzle is constantly encased in the guide portion. The cross section of the top portion of the gas-feeding nozzle, taken at right angles with the axial line of the gas-feeding nozzle, may have any form of a circle, a regular oval, an oval, a polygonal form and a polygonal form whose tops are rounded, while a circle and a polygonal form are preferred.

In the second embodiment of the present invention, preferably, the forward and backward movement of the top portion of the gas-feeding nozzle in the guide portion may be a rotary movement in one direction or a pivotal movement in two directions (clockwise and counterclockwise) with the axial line of the gas-feeding nozzle as a center. In this case, the cross section of the top portion of the gas-feeding nozzle, taken at right angles with the axial line of the gas-feeding nozzle, preferably has the form of a circle part of which is cut off or a circle having a dent portion as part.

In the gas-feeding device of the present invention, the clearance between the guide portion and the top portion Of the gas-feeding nozzle is preferably in the range in which the flowing of a molten resin into the clearance between the guide portion and the top portion of the gas-feeding nozzle can be prevented and the pressurized gas in a hollow portion formed within a cooled and solidified resin can be released.

In the first embodiment of the gas-feeding device of the present invention, although depending upon a molten resin, the temperature of the molten resin and pressure conditions, the clearance between the guide portion and the top portion of the gas-feeding nozzle is preferably 0.003 mm to 0.8 mm, more preferably 0.005 mm to 0.5 mm, particularly preferably 0.01 mm to 0.1 mm. When the above clearance is less than 0.003 mm, it is difficult to release the pressurized gas in a hollow portion formed in a cooled and solidified resin through the clearance between the guide portion and the top portion of the gas-feeding nozzle to atmosphere. Further, it is difficult to put the top portion of the gas-feeding nozzle in forward and backward movement. When the above clearance exceeds 0.8 mm, a molten resin may penetrate the clearance between the guide portion and the top portion of the gas-feeding nozzle when injected into the cavity. In the first embodiment of the present invention, preferably, the clearance between the guide portion and the top portion of the gas-feeding nozzle means a maximum of the total $(d_1+d_2)$ of distances between an inner wall of the guide portion and that outer wall of the top portion of the gas-feeding nozzle which is located in the vicinity of the top end surface of the gas-feeding nozzle, wherein the distances $d_1$ and $d_2$ are measured along a straight line passing the center of gravity on a cross section of the top portion of the gas-feeding nozzle, taken at right angles with the axial line of the gas-feeding nozzle. The top end surface of the top portion of the gas-feeding nozzle faces the cavity.

In the second embodiment of the gas-feeding device of the present invention, although depending upon a molten resin, the temperature of the molten resin and pressure conditions, the clearance between the guide portion and the top portion of the gas-feeding nozzle is preferably 0.0015 mm to 0.4 mm, more preferably 0.0025 mm to 0.25 mm, particularly preferably 0.005 mm to 0.05 mm. When the above clearance is less than 0.0015 mm, it is difficult to release the pressurized gas in a hollow portion formed in a cooled and solidified resin through the clearance between the guide portion and the top portion of the gas-feeding nozzle to atmosphere. Further, it is difficult to put the top portion of the gas-feeding nozzle in forward and backward movement. When the above clearance exceeds 0.4 mm, a molten resin may penetrate the clearance between the guide portion and the top portion of the gas-feeding nozzle when injected into the cavity. In the second embodiment of the present invention, the clearance between the guide portion and the top portion of the gas-feeding nozzle means a maximum distance (d) between that top end surface of the top portion of the gas-feeding nozzle which faces the cavity and the guide portion which faces this top end surface.

In the present invention, preferably, the top end surface of the top portion of the gas-feeding nozzle further constitutes part of a wall of the cavity when a molten resin is injected into the cavity.

Further, the gas-feeding nozzle preferably has a non-return valve for preventing the in-flow of a molten resin. The gas-feeding nozzle shifting means may have any mechanism, while it preferably has a constitution of a hydraulic cylinder, or a combination of a motor and a gear.

For preventing a resin from clogging the gas-feeding nozzle and accomplish the reliable gas feeding, it is also effective to heat the gas-feeding nozzle with a heating device disclosed in JP-A-4-31015. Specifically, it is sufficient to mount a ring-shaped heater on an outer wall of the top portion of the gas-feeding nozzle.

The resin used in the present invention is not specially limited. Examples of the resin include so-called generally used plastics such as a polyolefin resin, a polystyrene resin, an ABS resin, an AS resin, a PVC resin, a methacrylic resin and a fluorine-containing resin. Further, examples of the above resin also include engineering plastics such as a nylon resin, a saturated polyester resin, a polycarbonate resin, a polyacrylate resin, a polyacetal resin, a polysulfone resin and a modified polyphenylene ether resin. These resins may contain a fibrous reinforcement, a filler and a stabilizer as required. The gas used in the present invention can be selected from gaseous substances at room temperature such as nitrogen gas, carbon dioxide gas, air and helium gas. The above gas can also include gases liquefied under high pressure.

In the gas-feeding device of the present invention, the mold used does not require a valve opening having a valve seat. Therefore, the present invention principally overcomes the prior art problem that the contact of a cap of the gas-feeding nozzle and the valve seat of the valve opening under pressure is defective due to a foreign matter adhering to the valve seat. That is, the present invention can effectively prevent a molten resin from leaking from a marginal portion of the top portion of the gas-feeding nozzle and adhering the outer wall of the top portion of the gas-feeding nozzle when the molten resin is injected into the cavity. Further, the present invention can effectively prevent a pressurized gas from leaking out of a marginal portion of the top portion of the gas-feeding nozzle when the pressurized gas is fed.

In prior art technique, the cap mounted on the top portion of the gas-feeding nozzle repeats the action of contacting to, and parting from, the valve seat of the valve opening every injection molding shot, and the life of the gas-feeding nozzle is hence a problem which remains to solve. Therefore, the gas-feeding nozzle is required to be formed from a heat-treated, high-hardness material. In the gas-feeding device of the present invention, the top portion of the gas-feeding nozzle is free from contacting a mold under pressure, and the gas-feeding nozzle and the guide portion of the mold can be formed from materials of low grades.

Further, in the first embodiment of the gas-feeding device of the present invention having a constitution in which the top portion of the gas-feeding nozzle is constantly encased in the guide portion, that is, in which the top portion of the gas-feeding nozzle does not come off from the guide portion when the gas-feeding nozzle is in a backward position, e.g., the top portion of the gas-feeding nozzle stays inside the guide portion, e.g., by at least 1 mm, there can be prevented the leaking of a molten resin from the guide portion and the adhering of the molten resin to the wall of the top portion of the gas-feeding nozzle even when the molten resin is injected into the cavity while the gas-feeding nozzle is shifted to stay in a backward end position by an operation error. In a prior art technique, when a molten resin is injected into the cavity while the gas-feeding nozzle is shifted to stay in a backward end position, a large amount of a molten resin leaks from the valve opening so that the molten resin adheres to the outer wall of the top portion of the gas-feeding nozzle and is solidified. As a result, the top portion of the gas-feeding nozzle cannot be moved in the guide portion and molding can be no longer carried out.

BRIEF DESCRIPTION OF THE DRAWINGS

The present invention will be explained hereinafter with reference to drawings.

DESCRIPTION OF THE PREFERRED EMBODIMENTS

EXAMPLE 1

Figure 1A:
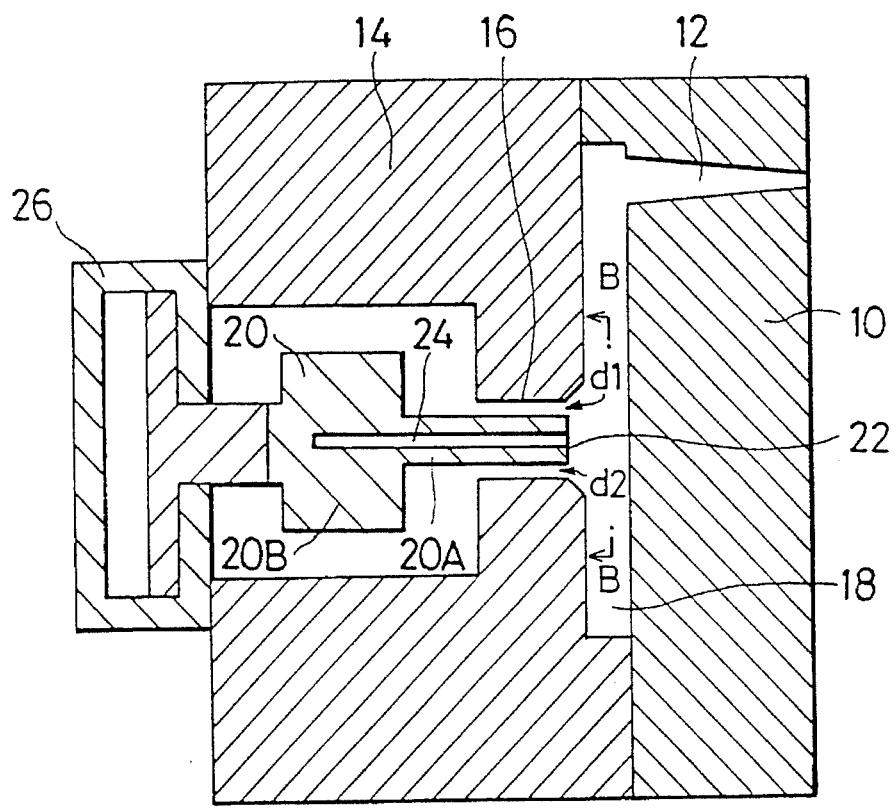
FIGS. 1A and 1B are schematic views of a mold of an injection molding machine having a gas-feeding device of Example 1.
Figure 1B:
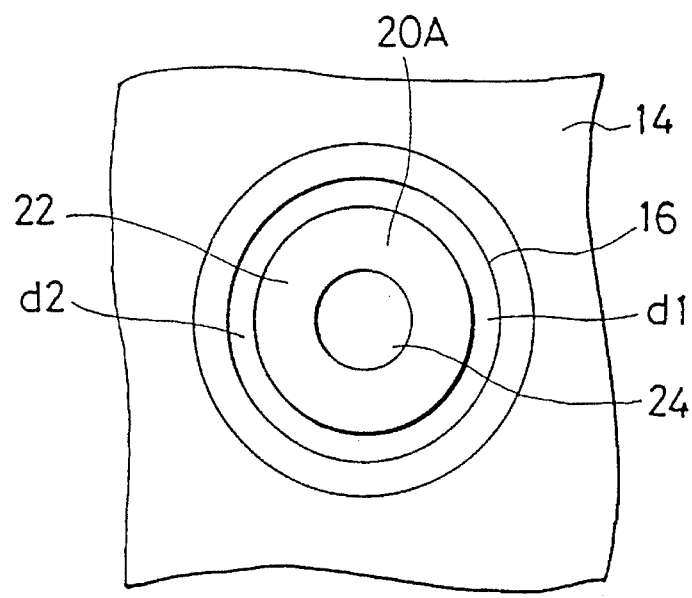

FIG. 1A shows a schematic cross sectional view of a mold of an injection molding machine having a gas-feeding device according to the first embodiment of the present invention. FIG. 1B shows a schematic view of a gas-feeding nozzle and a guide portion, viewed along a line B—B in FIG. 1A. A mold is composed of a fixed mold member 10 and a movable mold member 14, and part of the fixed mold member 10 and part of the movable mold member 14 forms a cavity 18. The fixed mold member 10 is provided with a sprue 12, and a molten resin is injected into the cavity 18 through the sprue 12. The movable mold member 14 is provided with a guide portion 16. The guide portion 16 communicates with the cavity 18 and with an outside of the mold, and has a nearly cylindrical form with both ends open. The guide portion 16 may be formed as part of the movable mold member 14, or it may be manufactured as such a guide member and integrated into the movable mold member 14.

A gas-feeding nozzle 20 is composed of a top portion 20A and a base portion 20B. The top portion 20A and base portion 20B may be integrally manufactured, or may be separately manufactured and assembled. The gas-feeding nozzle 20 linearly moves forward and backward in parallel with an axial line of the gas-feeding nozzle. The top portion 20A of the gas-feeding nozzle 20 is allowed to move in the guide portion 16. The base portion 20B of the gas-feeding nozzle 20 is attached to gas-feeding nozzle shifting means 26 composed of a hydraulic cylinder.

The central portion of the gas-feeding nozzle 20 is provided with a gas flow path 24. One end of the gas flow path 24 is extending to a top end surface 22 of the top portion 20A of the gas-feeding nozzle 20 and open to the cavity 18. The other end of the gas flow path 24 is connected to a tubing (not shown), and the tubing is connected to a pressurized gas source (not shown). That portion of the gas flow path 24 which is near the top end surface 22 of the gas-feeding nozzle 20 is preferably provided with a non-return valve (not shown) for preventing the counter-flow of the pressurized gas and the penetration of a molten resin.

The top end surface 22 of the top portion 20A of the gas-feeding nozzle 20 has such a form that it constitutes part of the wall of the cavity 18 when a molten resin is injected into the cavity 18. For example, the top end surface 22 of the gas-feeding nozzle 20 is flat, and the top end surface 22 has the form of a circle.

The top portion 20A of the gas-feeding nozzle 20 and the guide portion 16 had the cross sectional form, taken at right angles with the axial line of the gas-feeding nozzle, of a circle. Further, the cross sections of the top portion 20A of the gas-feeding nozzle 20 and the guide portion 16, taken at right angles with the axial line of the gas-feeding nozzle, had constant areas. Namely, when it is supposed that the top portion 20A of the gas-feeding nozzle 20 and the guide portion 16 are cut such that the cross sections contain a plane including the axial line of the gas-feeding nozzle 20, the cross sections of top portion 20A of the gas-feeding nozzle 20 and the guide portion 16 have the form of rectangle. The top portion 20A of the gas-feeding nozzle 20 had a constant outer diameter of 10 mm. Further, the guide portion 16 had an inner diameter of 10.04±0.01 mm. That is, the clearance $(d_1+d_2)$ provided between the top portion 20A of the gas-feeding nozzle 20 and the guide portion 16 was 0.03 mm to 0.05 mm. The guide portion 16 had a length of 8 mm.

Figure 2:
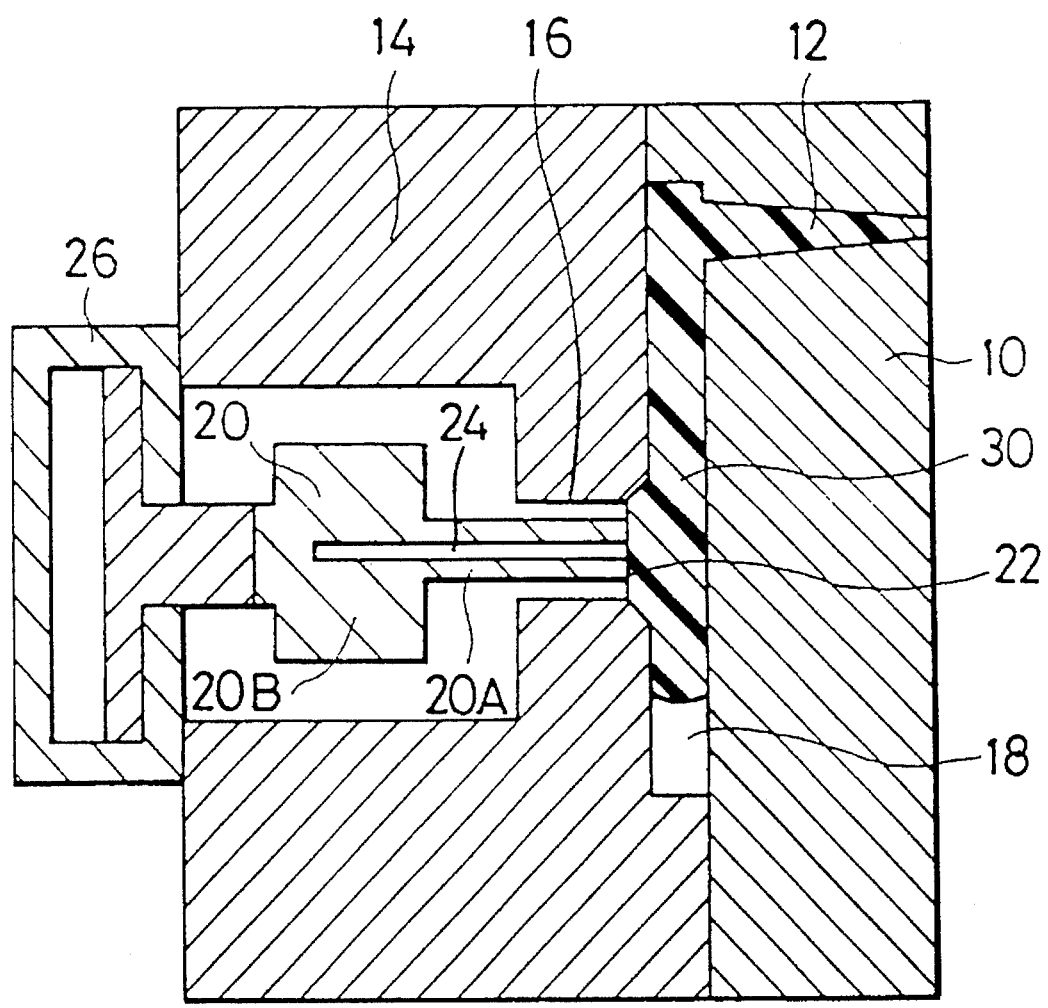
FIG. 2 is a schematic cross sectional view of a mold of an injection molding machine having a gas-feeding device of Example 1 in which a molten resin is being injected into a cavity.

The clearance ($d_1+d_2$) is provided as described above, whereby the penetration of a molten resin in the cavity 18 into the clearance between the guide portion 16 and the top portion 20A of the gas-feeding nozzle 20 can be prevented when the molten resin is injected into the cavity 18 or when a pressurized gas is fed into the molten resin (see FIG. 2). Further, the gas-feeding nozzle 20 is shifted backward with the gas-feeding nozzle shifting means 26 after the molten resin is cooled to solidness in the cavity 18, whereby a gap is formed between the top end surface 22 of the gas-feeding nozzle 20 and a molded article of the cooled and solidified resin, and the pressurized gas in a hollow portion of the molded article can be released to atmosphere through the above gap and through the clearance between the guide portion 16 and the top portion 20A of the gas-feeding nozzle 20 for a short period of time (see FIG. 4).

The gas-feeding nozzle shifting means 26 works to shift the entirety of the gas-feeding nozzle 20. That is, the gas-feeding nozzle shifting means 26 can allow the top portion 20A of the gas-feeding nozzle 20 to move in a forward and backward movement, more specifically, a linear forward and backward movement in parallel with the axial line of the gas-feeding nozzle, in the guide portion 16 provided in the movable mold member 14. In Example 1, the gas-feeding nozzle shifting means 26 worked to move the gas-feeding nozzle 20 forward and backward at a distance of 5 mm. That is, the movement of the gas-feeding nozzle 20 to a forward end position or a backward end position is controlled by the gas-feeding nozzle shifting means 26. When the gas-feeding nozzle 20 is positioned in a backward end position, the top portion 20A of the gas-feeding nozzle 20 stays inside the guide portion 16 by about 3 mm (see FIG. 4).

The top portion 20A of the gas-feeding nozzle 20 is encased in the guide portion 16, and the outer wall of the top portion 20A of the gas-feeding nozzle 20 and the inner wall of the guide portion 16 are out of contact to each other. The outer wall of the top portion 20A of the gas-feeding nozzle 20 and the inner wall of the guide portion 16 may be partially in contact with each other. The guide portion 16 is structured to have no seat surface with which to terminate the forward movement of the gas-feeding nozzle 20, so that no force is exerted on the movable mold member 14 from the gas-feeding nozzle shifting means 26 through the gas-feeding nozzle 20. The force of the gas-feeding nozzle shifting means 26 to the gas-feeding nozzle 20 was set at 1.2 metric ton. Namely, only when a resin pressure of over 1,500 kg/cm$^2$ is exerted on the top end surface 22 of the gas-feeding nozzle 20 from right hand side in FIG. 1, the gas-feeding nozzle 20 moves in the direction of left hand side in FIG. 1.

The method for injection molding by the use of the apparatus shown in FIG. 1 will be explained hereinafter with reference to FIGS. 1 to 4.

A thermoplastic resin (a polycarbonate resin, Iupilone S3000, supplied by Mitsubishi Gas Chemical Co., Inc) was injection molded with an injection molding machine (model IS350E-17B, supplied by Toshiba Machine Co., Ltd.) and a mold schematically shown in FIG. 1 to form a box-shaped article in the following manner.

First, while the mold was in an opened state, the gas-feeding nozzle shifting means 26 was actuated to shift the gas-feeding nozzle 20 to a backward end position. Then, the thermoplastic resin in an amount sufficient for filling the cavity 18 was plasticized and weighed in a cylinder (not shown) of the injection molding machine. The movable mold member 14 was moved and clamped, and the clamping pressure was increased up to 350 tons. The gas-feeding nozzle shifting means 26 was then actuated to shift the gas-feeding nozzle 20 to a forward end position, whereby the top end surface 22 of the top portion 20A of the gas-feeding nozzle 20 formed part of the cavity 18 as shown in FIG. 1.

Then, the molten resin 30 was injected into the cavity 18. Specifically, an injection unit (not shown) of the injection molding machine was moved forward to engage the nozzle portion of the cylinder (not shown) of the injection molding machine with the sprue 12 of the fixed mold member 10, and the molten resin preliminarily weighed in the cylinder was injected into the cavity 18 at an injection pressure of 1,200 kg/cm$^2$. FIG. 2 schematically shows the injection of the molten resin 30 into the cavity 18.

Figure 3:
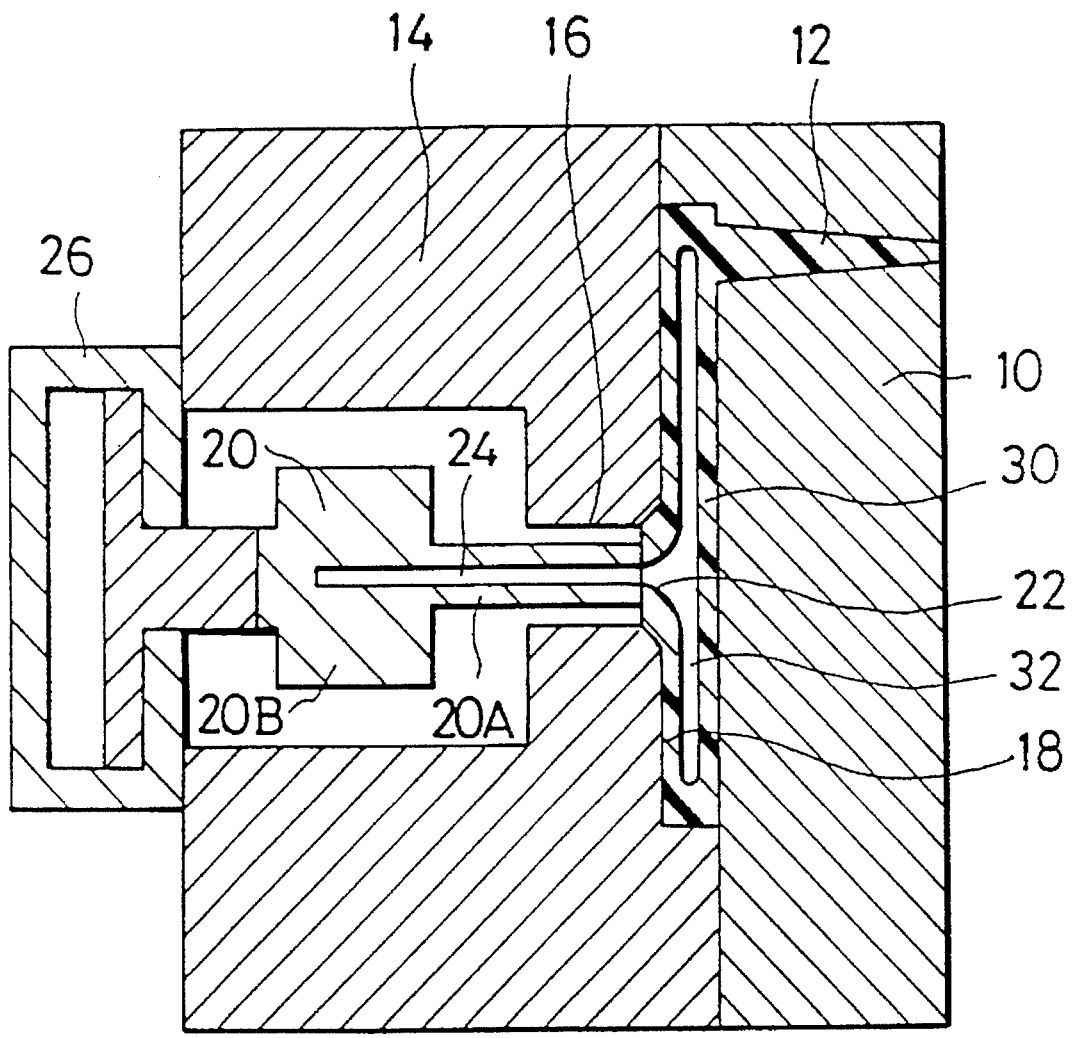
FIG. 3 is a schematic cross sectional view of a mold of an injection molding machine having a gas-feeding device of Example 1 in which a pressurized gas is fed into a molten resin injected into a cavity.

0.5 second after the injection of the molten resin into the cavity 18 was completed, a pressurized gas from a pressurized gas source (not shown) was fed into the molten resin 30 in the cavity 18 from the top end surface 22 of the gas-feeding nozzle 20 through a tubing (not shown) and the gas flow path 24. The pressurized gas was set at a pressure of 75 kg/cm$^2$-G when fed into the molten resin. As a result, the hollow portion 32 was formed within the molten resin 30 in the cavity 18. FIG. 3 schematically shows the formation of the hollow portion 32.

Thereafter, the above state was maintained for 40 seconds until the molten resin 30 in the cavity 18 was cooled to solidness. After the above period of 40 seconds, the pressurized gas fed into the resin in the cavity showed a pressure of 48 kg/cm$^2$-G. The molten resin or the resin being cooled to solidness is pressed to the mold wall of the cavity 18 by the pressurized gas in the hollow portion 32 until the solidification of the molten resin 30 in the cavity 18 is completed, which effectively prevents a molded article obtained by cooling the molten resin to solidness from having sink marks and distortion.

Figure 4:
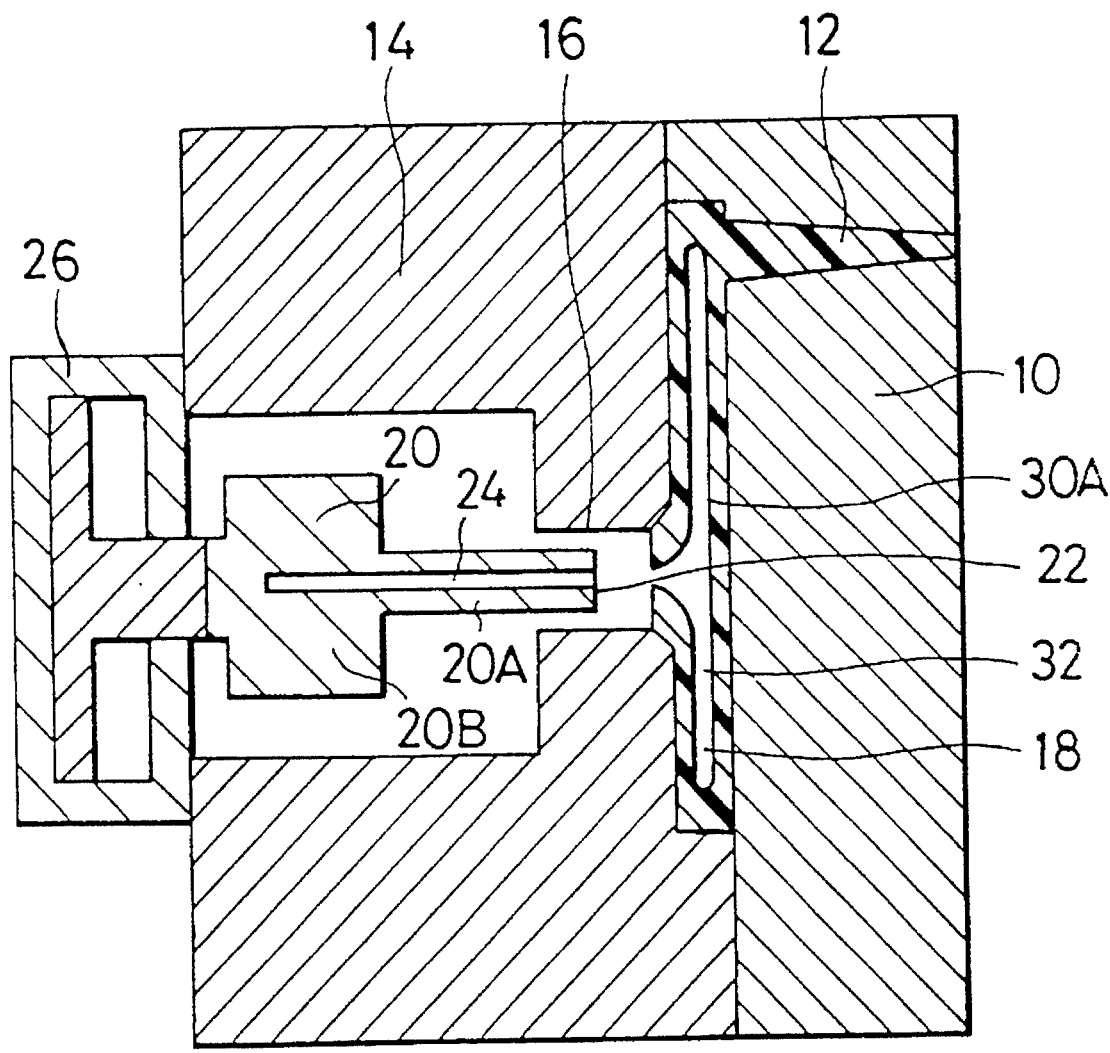
FIG. 4 is a schematic cross sectional view of a mold of an injection molding machine having a gas-feeding device of Example 1 in which a pressurized gas within a cooled and solidified resin is being released to atmosphere.

Then, the gas-feeding nozzle shifting means 26 was actuated to move the gas-feeding nozzle 20 to a backward end position, whereby the top end surface 22 of the gas-feeding nozzle 20 was spaced from the surface of the molded article 30A. FIG. 4 schematically shows this state. As a result, the gas in the hollow portion 32 formed within the molded article 30A in the cavity 18 was released to atmosphere through the clearance between the top portion 20A of the gas-feeding nozzle 20 and the guide portion 16.

Finally, the movable mold member 14 was moved to open the mold, and the molded article 30A was taken out of the mold. The so-obtained molded article 30A had an excellent appearance free of sink marks and distortion.

EXAMPLE 2

Figure 5A:
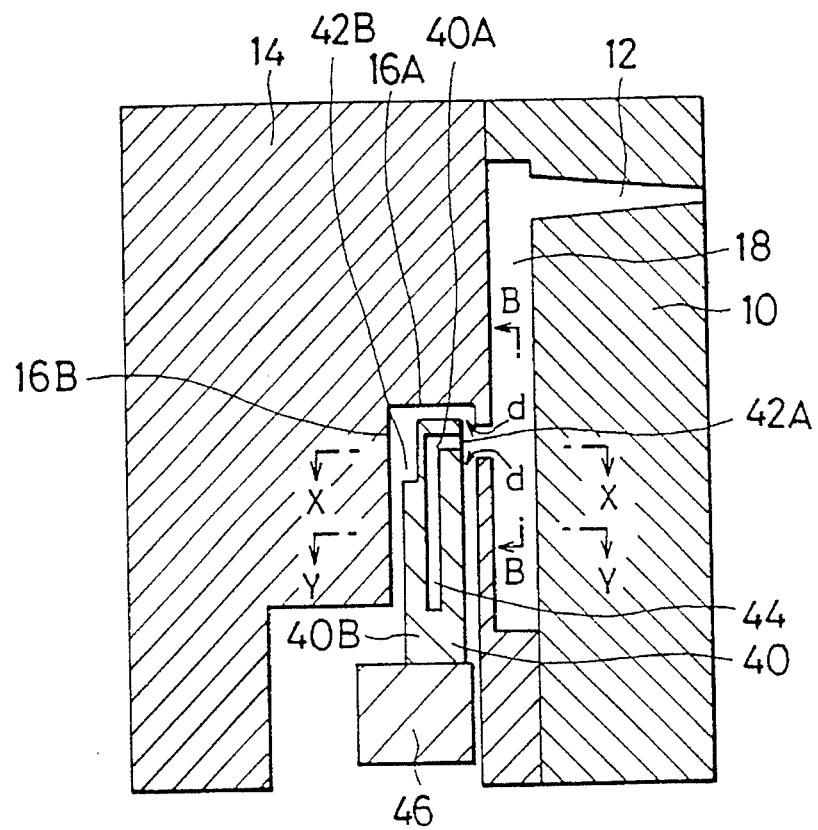
FIGS. 5A and 5B are schematic views of a mold of an injection molding machine having a gas-feeding device of Example 2.
Figure 5B:
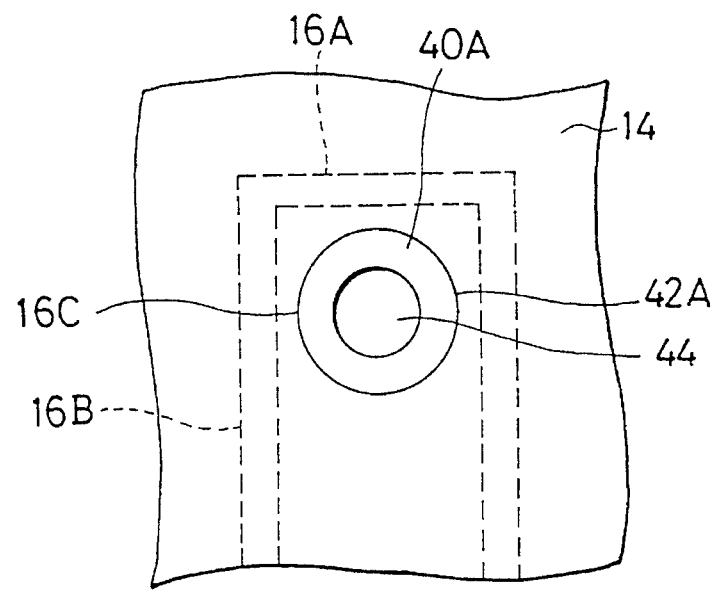
Figure 6A:
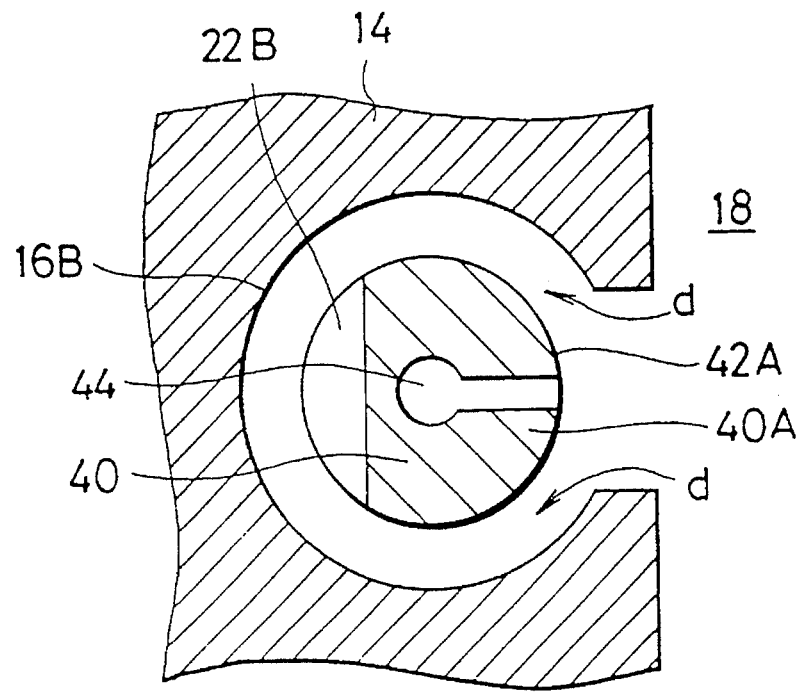
FIGS. 6A and 6B are schematic cross sectional views of a gas-feeding nozzle and a guide portion, taken along lines X—X and Y—Y in FIG. 5A.
Figure 6B:
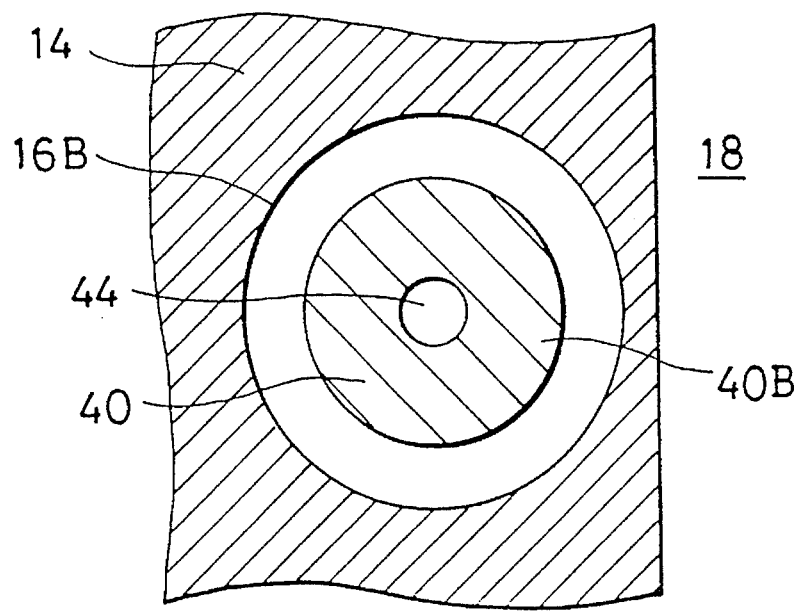

FIG. 5A schematically shows a cross section of a mold of an injection molding machine having a gas-feeding device according to the second embodiment of the present invention. FIG. 5B shows a schematic view of a gas-feeding nozzle and a guide portion, viewed along a line B—B in FIG. 5A. Further, FIGS. 6A and 6B schematically show cross sections of the gas-feeding nozzle and the guide portion, taken along lines X—X and Y—Y in FIG. 5A. However, a fixed mold member 10 is not shown. The mold has the same structure as that of the mold shown in FIG. 1. The guide portion 16 has a nearly cylindrical structure in which one end is open, the other end 16A is closed and a circular opening 16C is formed on a side surface near the other end 16A. Reference numeral 16B indicates a side portion of the guide portion 16 having a cylindrical form.

The gas-feeding nozzle 40 is integrally composed of a top portion 40A and a bottom portion 40B. The top portion 40A of the gas-feeding nozzle 40 faces a cavity 18 through the opening 16C formed in the guide portion 16. The bottom portion 40B of the gas-feeding nozzle 40 is encased in the side portion 16B of the guide portion. The forward and backward movement of the top portion 40A of the gas-feeding nozzle 40 is a rotary movement in one direction or pivotal movement in two directions (clockwise and counterclockwise) with the axial line of the gas-feeding nozzle as a center. The bottom portion 40B of the gas-feeding nozzle 40 is attached to gas-feeding nozzle shifting means 46 composed of a combination of a motor and a gear. The central portion of the gas-feeding nozzle 40 is provided with a gas flow path 44, one end of which is extending to an top end surface 42A of the top portion 40A of the gas-feeding nozzle 40 and opens to the cavity 18. The other end of the gas flow path 44 is connected to a tubing (not shown), and the tubing is connected to a pressurized gas source (not shown). That portion of the gas flow path 44 which is near the top end surface 42A of the gas-feeding nozzle 40 is preferably provided with a non-return valve (not shown) for preventing the counter-flow of a pressurized gas and the penetration of a molten resin.

The top end surface 42A of the top portion 40A of the gas-feeding nozzle 40 has such a form that it constitutes part of the wall of the cavity 18 when a molten resin is injected into the cavity 18.

As shown in FIG. 6A, the cross section of the top portion 40A of the gas-feeding nozzle 40, taken at right angles with the axial line of the gas-feeding nozzle, had a circular form part of which was cut off. An arc portion constitutes the top end surface 42A. The presence of a chord portion (cut-off portion) 42B works to release a pressurized gas in a hollow portion of a molded article to atmosphere for a short period of time. As shown in FIGS. 5A or 6A, the clearance (d) between the top portion 40A of the gas-feeding nozzle 40 and the guide portion 16 (more specifically, a maximum distance between the top end surface 42A of the gas-feeding nozzle 40 facing the cavity 18 and the guide portion 16A, 16B facing the top end surface 42A) was 0.015 to 0,025 mm. The presence of the above clearance (d) can prevent the penetration of a molten resin into the clearance between the guide portion 16A, 16B and the top portion 40A of the gas-feeding nozzle 40 when the molten resin is injected into the cavity 18 or when a pressurized gas is fed into the molten resin. After the molten resin is cooled to solidness in the cavity 18, the gas-feeding nozzle shifting means 46 is actuated to revolve or rotate or pivot the gas-feeding nozzle 40, whereby the top end surface 42A of the gas-feeding nozzle 40 and a molded article of the cooled and solidified resin are spaced from each other. As a result, the pressurized gas in a hollow portion of the molded article can be released to atmosphere through a gap between the cut-off portion 42B of the gas-feeding nozzle 40 and the guide portion 16A, 16B and through a gap between the bottom portion 40B of the gas-feeding nozzle 40 and the side portion 16B of the guide portion for a short period of time.

The gas-feeding nozzle shifting means 46 works to revolve or rotate or pivot the entirety of the gas-feeding nozzle 40 in one direction or in both directions (clockwise and counterclockwise) with the axial line of the gas-feeding nozzle as a center. More specifically, the gas-feeding nozzle shifting means 46 can put the top portion 40A of the gas-feeding nozzle 40 in a forward and backward movement, more specifically rotary or pivotal movement, clockwise, counterclockwise or both as the axial line of the gas-feeding nozzle as a center.

The outer wall of the top portion 40A of the gas-feeding nozzle 40 and the inner wall of the guide portion 16A, 16B are out of contact to each other. Therefore, no force is exerted on the movable mold member 14 from the gas-feeding nozzle shifting means 46 through the gas-feeding nozzle 40.

Figure 7A:
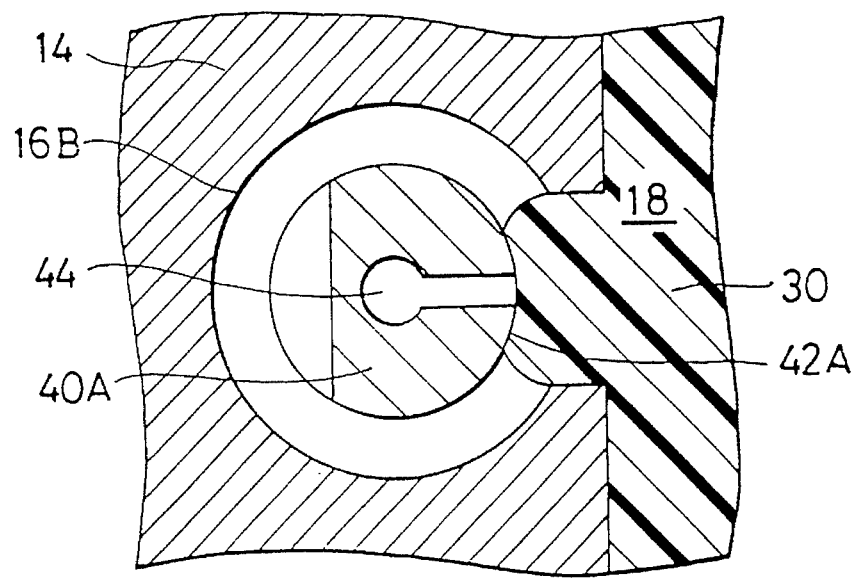
FIGS. 7A and 7B are schematic cross sectional view of a gas-feeding nozzle and a guide portion in Example 2, in which a molten resin is being injected into a cavity, and a pressurized gas is being fed into a molten resin to form a hollow portion.
Figure 7B:
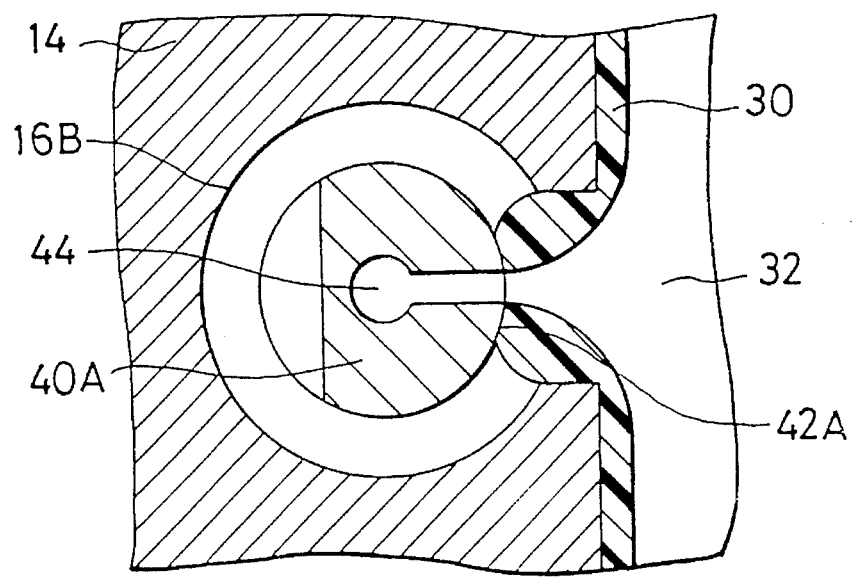
Figure 8:
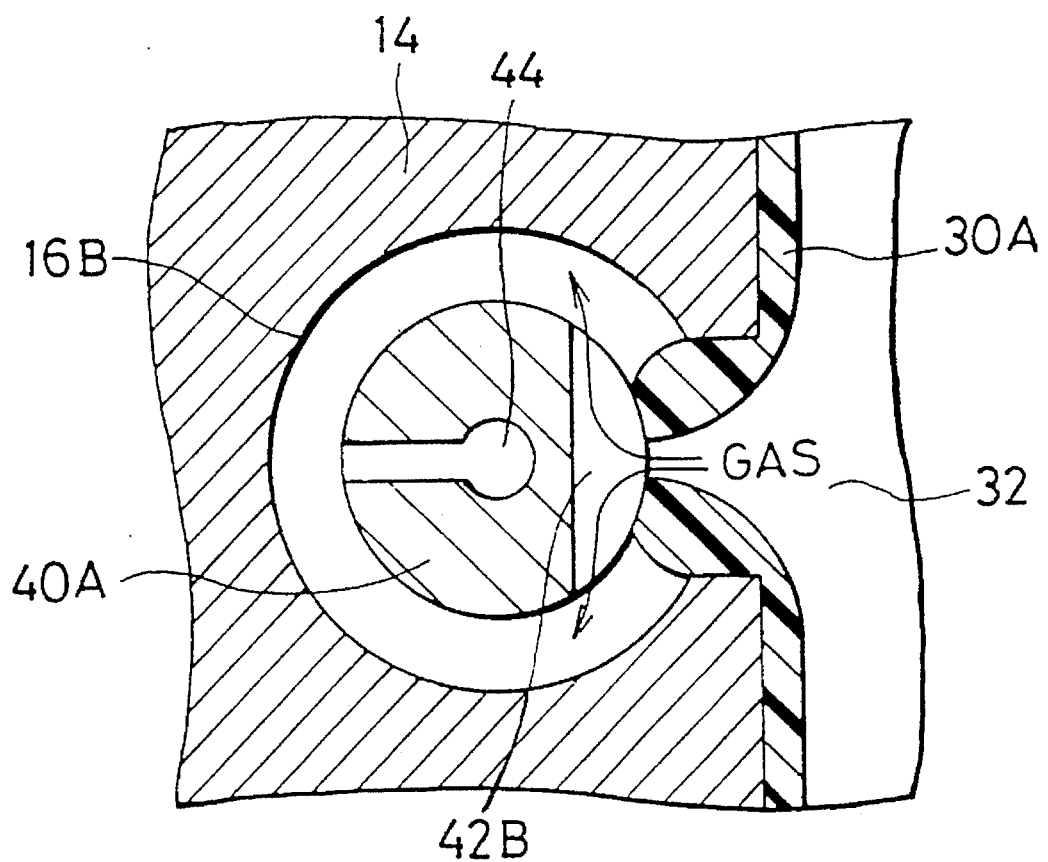
FIG. 8 is a schematic cross sectional view of a gas-feeding nozzle and a guide portion in Example 2, in which a pressurized gas in a cooled and solidified resin is released to atmosphere.

The injection molding method using an apparatus having the gas-feeding device shown in FIGS. 5 and 6 will be explained below with reference to FIGS. 7 and 8. FIGS. 7 and 8 show schematic cross sectional views of the gas-feeding nozzle and the guide portion, taken along a line X—X in FIG. 5A. However, the fixed mold member 10 is not shown in FIGS. 7 and 8.

A thermoplastic resin (a polycarbonate resin, Iupilone S3000, supplied by Mitsubishi Gas Chemical Co., Inc) was injection molded with an injection molding machine (model IS350E-17B, supplied by Toshiba Machine Co., Ltd.) and a mold schematically shown in FIG. 5 to form a box-shaped article in the following manner.

First, the resin in an amount sufficient for filling the cavity 18 was plasticized and weighed in a cylinder (not shown) of the injection molding machine. The movable mold member 14 was moved and clamped, and the clamping pressure was increased up to 350 tons. The gas-feeding nozzle shifting means 46 was actuated to rotate the gas-feeding nozzle 40 in forward movement so that the top end surface 42A of the gas-feeding nozzle 40 faced the cavity 18, whereby the top end surface 42A of the top portion 40A of the gas-feeding nozzle 40 formed part of the cavity 18 as shown in FIG. 5 and the gas-feeding nozzle 40 was positioned at a forward end position.

Then, the molten resin 30 was injected into the cavity 18. Specifically, an injection unit (not shown) of the injection molding machine was moved forward to engage the nozzle portion of the cylinder (not shown) of the injection molding machine with the sprue 12 of the fixed mold member 10, and the molten resin preliminarily weighed in the cylinder was injected into the cavity 18 at an injection pressure of 1,200 kg/cm$^2$. FIG. 7A schematically shows the injection of the molten resin 30 into the cavity 18.

0.5 second after the injection of the molten resin into the cavity 18 was completed, a pressurized gas from a pressurized gas source (not shown) was fed into the molten resin 30 in the cavity 18 from the top end surface 42A of the gas-feeding nozzle 40 through a tubing (not shown) and the gas flow path 44. The pressurized gas was set at a pressure of 75 kg/cm$^2$-G when fed into the molten resin. As a result, the hollow portion 32 was formed within the molten resin 30 in the cavity 18. FIG. 7B schematically shows the formation of the hollow portion 32.

Thereafter, the above state was maintained for 40 seconds until the molten resin 30 in the cavity 18 was cooled to solidness. After the above period of 40 seconds, the pressurized gas fed into the resin in the cavity showed a pressure of 48 kg/cm$^2$-G. The molten resin or the resin being cooled to solidness is pressed to the mold wall of the cavity 18 by the pressurized gas in the hollow portion 32 until the solidification of the molten resin 30 in the cavity 18 is completed, which effectively prevents a molded article 30A obtained by cooling the molten resin to solidness from having sink marks and distortion.

Then, the gas-feeding nozzle shifting means 46 was actuated to revolve or rotate or pivot the gas-feeding nozzle 40 so that the cut-off portion 42B faced the cavity 18 and the gas-feeding nozzle 40 was positioned at a backward end position. As a result, the top end surface 42A of the gas-feeding nozzle 40 was spaced from the surface of the molded article 30A. FIG. 8 schematically shows this state. In consequence, the gas in the hollow portion 32 formed within the molded article 30A in the cavity 18 was released to atmosphere through the clearance between the top portion 40A of the gas-feeding nozzle 40 and the guide portion 16.

Finally, the movable mold member 14 was moved to open the mold, and the molded article 30A was taken out of the mold. The so-obtained molded article 30A had an excellent appearance free of sink marks and distortion.

The present invention was explained above with reference to preferred embodiments, while the present invention shall not be limited thereto. The conditions for injecting molten resins, the conditions for feeding pressurized gas and the conditions for cooling and solidifying resins, described above, are examples, and can be properly changed. The various conditions such as the amount, temperature, pressure or injection rate of a resin to be injected, the amount, pressure or rate of a gas to be introduced and the time for cooling a mold should be properly selected and controlled depending upon the kind of a resin to be used, the form of a cavity to be used, and the like, and the above conditions cannot be uniformly determined. The form of a molded article, the structures of an injection molding machine and a mold, the structures of the gas-feeding nozzle and the gas-feeding device and the arrangement of the gas-feeding nozzle relative to the cavity can be also design-changed. In each Example, the pressurized gas was fed into the molten resin after a predetermined period of time from the completion of the injection of the molten resin into the cavity, while the pressurized gas may be fed into the molten resin just after the injection of the molten resin into the cavity is completed or during the injection of the molten resin into the cavity. The wording "during the injection of the molten resin" means a period of time from the initiation of the injection of the molten resin to the termination of the injection of the molten resin.

The gas-feeding nozzle shifting means 46 composed of a combination of a gear and motor, used for the gas-feeding device described in Example 2, may be replaced with the gas-feeding nozzle shifting means 26 composed of a hydraulic cylinder, described in Example 1, whereby the forward and backward movement of the top portion of the gas-feeding nozzle can be changed to a linear movement in parallel with the axial line of the gas-feeding nozzle.

What is claimed is:

1. A gas-feeding device, for use in a mold attached to an injection molding machine for producing a molded article having a hollow portion and provided with a guide portion communicating with a cavity of the mold and an outside of the mold, and for feeding a pressurized gas into a molten resin injected into the cavity, comprising:

(A) a gas-feeding nozzle, provided with a gas flow path for feeding the pressurized gas into a molten resin injected into the cavity, and having a clearance between its top portion and the guide portion such that at least part of its top portion is out of contact with the guide portion when injecting the molten resin into the cavity, and its top portion being constantly encased in the guide portion; and (B) gas-feeding nozzle shifting means for putting the top portion of the gas-feeding nozzle in forward and backward linear movement in the guide portion in parallel with an axial line of the gas-feeding nozzle, wherein the clearance is in a range where flowing of the molten resin into the clearance is prevented and where the pressurized gas in the hollow portion formed in the molded article obtained by cooling the molten resin to the solid state is released to atmosphere through the clearance when the top portion of the gas-feeding nozzle is moved backward by the gas-feeding nozzle shifting means.

2. The gas-feeding device according to claim 1, wherein cross sections of the top portion of the gas-feeding nozzle and the guide portion, taken at right angles with the axial line of the gas-feeding nozzle, have constant areas.

3. The gas-feeding device according to claim 1, wherein a cross section of the top portion of the gas-feeding nozzle, taken at right angles with the axial line of the gas-feeding nozzle, is circular or polygonal.

4. The gas-feeding device according to claim 1, wherein the clearance between the guide portion and the top portion of the gas-feeding nozzle is 0,003 mm to 0.8 mm.

5. The gas-feeding device according to claim 1, wherein a top end surface of the top portion of the gas-feeding nozzle constitutes part of a wall of the cavity when injecting the molten resin into the cavity.

* * * * *